(12) United States Patent
Tamura et al.

(10) Patent No.: US 9,049,684 B2
(45) Date of Patent: Jun. 2, 2015

(54) GATEWAY DEVICE, BASE STATION, MOBILE MANAGEMENT SERVER, AND COMMUNICATION METHOD

(75) Inventors: Tomu Tamura, Minato-ku (JP); Yoshio Ueda, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 13/637,931

(22) PCT Filed: Mar. 17, 2011

(86) PCT No.: PCT/JP2011/056396
§ 371 (c)(1),
(2), (4) Date: Sep. 27, 2012

(87) PCT Pub. No.: WO2011/142175
PCT Pub. Date: Nov. 17, 2011

(65) Prior Publication Data
US 2013/0021978 A1    Jan. 24, 2013

(30) Foreign Application Priority Data
May 13, 2010    (JP) .................................. 2010-111182

(51) Int. Cl.
| | |
|---|---|
| *H04W 60/04* | (2009.01) |
| *H04W 12/10* | (2009.01) |
| *H04W 12/02* | (2009.01) |
| *H04W 12/04* | (2009.01) |
| *H04W 84/04* | (2009.01) |

(52) U.S. Cl.
CPC .............. *H04W 60/04* (2013.01); *H04W 12/04* (2013.01); *H04W 12/10* (2013.01); *H04W 84/045* (2013.01); *H04W 12/02* (2013.01)

(58) Field of Classification Search
CPC ... H04W 84/045; H04W 88/06; H04W 8/082; H04W 36/0022; H04W 88/16; H04W 72/005
USPC ....................................................... 380/255–47
See application file for complete search history.

(56) References Cited

U.S. PATENT DOCUMENTS

| 8,340,023 B2 * | 12/2012 | Watfa et al. ................... 370/328 |
| 2004/0096062 A1 * | 5/2004 | Oh ................................. 380/270 |
| 2009/0082010 A1 | 3/2009 | Lee et al. |

(Continued)

FOREIGN PATENT DOCUMENTS

| JP | 2009-504048 A | 1/2009 |
| JP | 2009-049485 A | 3/2009 |

(Continued)

OTHER PUBLICATIONS

New WID: Local IP Access and Selected IP Traffic Offload (SA WG1 and SA WG3 updates to the WID for Local IP Access & Selected IP Traffic Offload), Huawei, 3GPP TSG SA WG2 Meeting #75, Aug. 31, 2009-Sep. 4, 2009, 6 pages, TD S2-096108, Kyoto, Japan.

(Continued)

*Primary Examiner* — Fan Ng
(74) *Attorney, Agent, or Firm* — Sughrue Mion, PLLC

(57) ABSTRACT

A gateway device connects a base station to a core network. The gateway device has a communication unit that receives, from a mobile management server in the core network, a key that cancels ciphering that was set in an NAS message that was received from a terminal that is subordinate to the base station.

8 Claims, 9 Drawing Sheets

(56) References Cited

U.S. PATENT DOCUMENTS

| | | |
|---|---|---|
| 2009/0197589 A1 | 8/2009 | Kitazoe |
| 2009/0270111 A1 | 10/2009 | Nakamura et al. |
| 2010/0172500 A1* | 7/2010 | Wu .............................. 380/272 |
| 2010/0272263 A1* | 10/2010 | Yao et al. ..................... 380/270 |
| 2011/0188457 A1* | 8/2011 | Shu et al. ..................... 370/329 |

FOREIGN PATENT DOCUMENTS

| | | |
|---|---|---|
| JP | 2009-094651 A | 4/2009 |
| JP | 2009-111624 A | 5/2009 |
| JP | 2009-253431 A | 10/2009 |
| JP | 2009-267706 A | 11/2009 |
| JP | 2010-041585 A | 2/2010 |
| JP | 2010-074801 A | 4/2010 |
| WO | 2007/015067 A2 | 2/2007 |
| WO | 2009/097602 A1 | 8/2009 |
| WO | 2010/050222 A1 | 5/2010 |

OTHER PUBLICATIONS

3GPP TS 36.413, 3rd Generation Partnership Project, V9.1.0, Dec. 2009, pp. 1-236.
3GPP TS 36.300, 3rd Generation Partnership Project, V9.2.0, Dec. 2009, pp. 1-178.
3GPP TS 33.401, 3rd Generation Partnership Project, V9.2.0, Dec. 2009, pp. 1-104.
3GPP TS 24.301, 3rd Generation Partnership Project, V9.1.0, Dec. 2009, pp. 1-285.
Chinese Office Action corresponding to Chinese Patent Application No. 201180023897.4, dated Sep. 2, 2014.

* cited by examiner

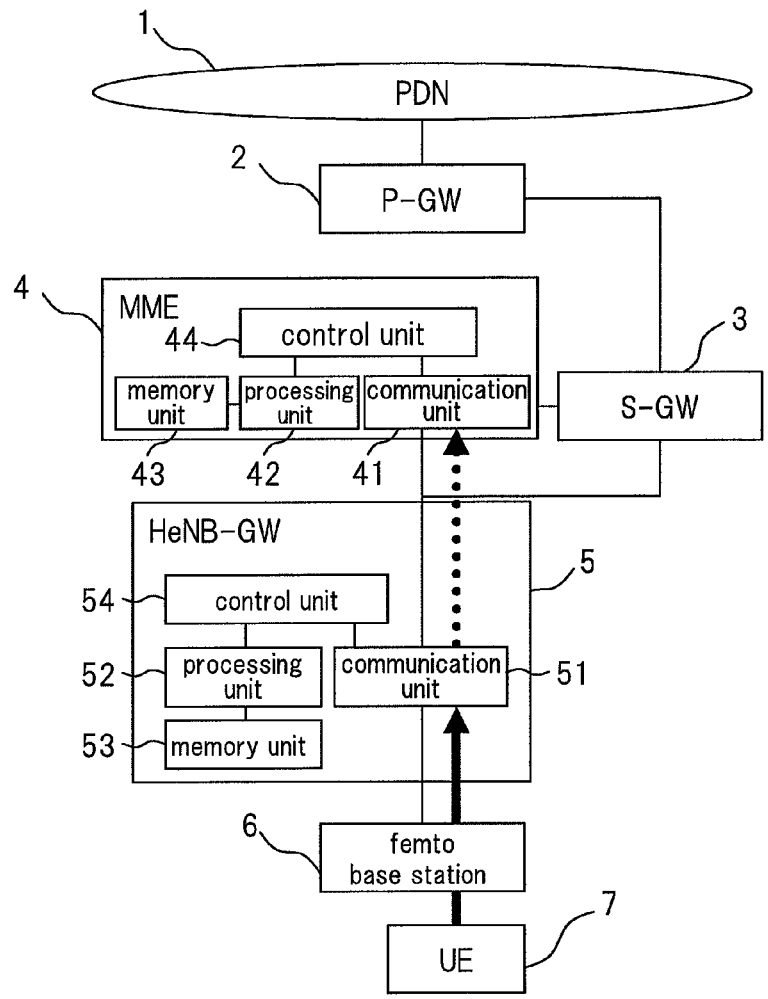

Fig.5

5.1.4.1 Integrity requirements

Synchronization of the input parameters for integrity protection shall be ensured for the protocols involved in the integrity protection.

Integrity protection, and replay protection, may be provided to NAS and RRC-signalling.

NOTE 1: Integrity protection, and replay protection is recommended to be used. All NAS signaling messages may be integrity-protected. All RRC signaling messages except those explicitly listed in TS 36.331 [21] as exceptions shall be integrity-protected.

When authentication of the credentials on the UICC during Emergency Calling in Limited Service Mode, as defined in the TS 23.401 [2], can not be successfully performed, the integrity and replay protection of the RRC and NAS signaling shall be omitted (see clause 15). This shall be accomplished by the network by selecting EIA0 for integrity protection of NAS and RRC. EIA0 shall only be used for unauthenticated emergency calls.

User plane packets between the eNB and the UE shall not be integrity protected.

Fig.6

9.1.x.x SECURITY INFO REQUEST
This message is sent by the eNB to request the security information over the S1 interface.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Key name | M | | 9.2.x.x | | YES | reject |
| S-TMSI | M | | 9.2.3.6 | | YES | reject |

9.1.x.x SECURITY INFO RESPONSE
This message is sent by the MME as a response to a SECURITY INFO REQUEST message.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Security Key | M | | 9.2.1.41 | A fresh KeNB is provided after performing a key-change on the fly procedure in the MME, see [15] Information related to other keys than a fresh KeNB may be provided. | YES | reject |

9.2.x.x Key name
The *Key name* is an information element that is used to indicate the key in MME.

| IE/Group Name | Presence | Range | IE type and reference | Semantics description |
|---|---|---|---|---|
| Key name | M | | OCTET STRING | |

Fig.7

9.1.4.8 UE CONTEXT MODIFICATION REQUEST
This message is sent by the MME to provide UE Context information changes to the eNB.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A fresh KeNB is provided after performing a key-change on the fly procedure in the MME, see [15] Information related to other keys than a fresh KeNB may be provided. | YES | reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |

9.2.1.41 Security Key
*The Security Key IE* is used to apply security in the eNB for different scenarios as defined in [15].

| IE/Group Name | Presence | Range | IE Type and Reference | Semantics Description |
|---|---|---|---|---|
| Security Key | M | | BIT STRING (SIZE(256)) | Key material for KeNB or Next Hop Key or other information as defined in [15] |

Fig.8

9.1.4.8 UE CONTEXT MODIFICATION REQUEST
This message is sent by the MME to provide UE Context information changes to the eNB.
Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key for AS | O | | 9.2.1.41 | A fresh KeNB is provided after performing a key-change on the fly procedure in the MME, see [15] | YES | Reject |
| Security Key for NAS | O | | 9.2.1.41 | Information related to other keys than a fresh KeNB may be provided. | YES | Reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |

9.2.1.41 Security Key for AS
The *Security Key for AS* IE is used to apply security in the eNB for different scenarios as defined in [15].

| IE/Group Name | Presence | Range | IE Type and Reference | Semantics Description |
|---|---|---|---|---|
| Security Key for AS | M | | BIT STRING (SIZE(256)) | Key material for KeNB or Next Hop Key as defined in [15] |

9.2.1.XX Security Key for NAS
The *Security Key for NAS* IE is used to apply security in the eNB for different scenarios as defined in [15].

| IE/Group Name | Presence | Range | IE Type and Reference | Semantics Description |
|---|---|---|---|---|
| Security Key for NAS | M | | BIT STRING (SIZE(256)) | Information other than Key materials for KeNB or Next Hop Key as defined in [15]. |

| Object UE | Execute offloading | Do not execute offloading |
|---|---|---|
| UE7 | APN1 | APN2, APN3 |
| UE8 | APN1, APN2 | APN3 |
| ... | ... | ... |

GATEWAY DEVICE, BASE STATION, MOBILE MANAGEMENT SERVER, AND COMMUNICATION METHOD

CROSS REFERENCE TO RELATED APPLICATIONS

This application is a National Stage of International Application No. PCT/JP2011/056396 filed Mar. 17, 2011, claiming priority based on Japanese Patent Application No. 2010-111182 filed May 13, 2010, the contents of all of which are incorporated herein by reference in their entirety.

TECHNICAL FIELD

The present invention relates to a gateway device, a base station, a mobile management server, and a communication method.

BACKGROUND ART

In an LTE (Long-Term Evolution) radio communication system, compact femto base stations (HeNB: Home-evolved Node B) operate. In the following explanation, known base stations (eNB: evolved Node B) are referred to as "macro base stations" to distinguish them from femto base stations.

A femto base station is typically an apparatus purchased by a user and installed in a residence or business office. After installation, a femto base station is connected to a gateway device referred to as an HeNB-GW (HeNB-Gateway) that concentrates femto base stations, and is connected to a core network of the communication business by way of the HeNB-GW.

It is believed that the following problems arise under these circumstances.

(1) Frequent incidence of position registration requests to the femto base station from UE (User Equipment: terminals)

(2) Increase of load upon the core network that is beyond the HeNB-GW when the amount of UE communication increases For the above-described problem (1), it is proposed in Patent Document 1 that the following algorithm be applied to a LTE radio communication system. In this algorithm, an FNG (Femto Network Gateway, which corresponds to HeNB-GW) converts the MNC (Mobile Network Code) that is contained in macro-position registration area ID (the identifier of a position registration area of a macro base station) to the MNC of the femtocell net and sets the macro-position registration area ID after conversion as the femto position registration area ID (the identifier of the position registration area of the femto base station). When the MNC that is contained in a position registration area ID that is reported from a base station in the vicinity is compatible with an MNC that is contained in the position registration area ID at the time of the previous position registration, position registration is not carried out by the UE, thereby enabling a decrease in the frequency of UE position registration requests. FIG. 7 of Patent Document 1 shows the sequence at the time that a UE implements position registration. In procedure 356 of this sequence, as shown in FIG. 9 of Patent Document 1, an FNG converts the femto position registration area ID of a femto base station that is included in the position registration request that is received from the UE to the macro position registration area ID of a neighboring macro base station of the femto base station and transmits the position registration request that follows this conversion to a MME (Mobility Management Entity: mobility management server) in the core network. The neighboring macro base station is a macro base station that is at a position at which the femto base station can receive the macro position registration area ID that is reported from the macro base station (the same applies to the following explanation).

However, according to 3GPP (3$^{rd}$ Generation Partnership Project), in an LTE radio communication system, ciphering and integrity protection can be set in data in the interest of ensuring security.

The setting of ciphering is the use of a ciphering key by the transmitting side to encode data. In this case, the receiving side decodes the data using the same ciphering key as the transmitting side.

The setting of integrity protection is performed by using of an integrity key by the transmitting side to calculate an authentication code of the data and then by adding the calculated authentication code to the data. In this case, the receiving side uses the same integrity key as the transmitting side to calculate the authentication code of the data and then verifies the integrity of the data by comparing the calculated authentication code with the authentication code that is added to the data.

However, according to TS33.401 v 9.2.0 and TS36.300 V9.2.0, which are recommendations of the 3GPP, while the setting of ciphering in NAS (Non Access Stratum) signaling is open to selection, the setting of integrity protection is required. In addition, the ciphering and integrity protection of NAS signaling is terminated at the MME. In other words, in the case of NAS signaling, decoding that employs the above-described ciphering key and verification of integrity that employs the above-described integrity key are carried out at an MME.

When the ciphering and integrity protection are set in NAS signaling, the ciphering of the position registration request by way of NAS must be cancelled in HeNB-GW in order to convert the femto position registration area ID that is contained in the position registration request that is received as the NAS signaling from a UE to a macro position registration area ID as in Patent Document 1. Still further, in the HeNB-GW, integrity protection must be reset after the above-described conversion in order that the MME does not interpret {its absence} due to the above-described conversion as the loss of integrity of the position registration request.

With regard to the above-described problem (2), a data offloading method referred to as LIPA (Local IP Access)/SIPTO (Selected IP Traffic Offload) has been proposed in Non-Patent Document 1 (S2-096108), which is a contributed article submitted to the working group "SA (Security Association) 2" of the 3GPP.

LIPA enables the offloading of data from a UE to an LAN (Local Area Network) by way of a femto base station and the transfer of data between a UE and an apparatus in the LAN. In addition, SIPTO enables the offloading of data from a femto base station directly to the Internet without being routed by way of the core network of a communication business.

In Patent Document 2, an access point (corresponding to a femto base station) is proposed that enables communication from a mobile telephone (corresponding to a UE) with, for example, a network server on the Internet by way of an IP gateway that is installed in the user's residence or office without being routed by way of the core network of a communication business in the system that is shown in FIG. 1 of Patent Document 2.

Alternatively, as shown in FIG. 1B of Patent Document 3, Patent Document 3 proposes a femto access point (corresponding to a femto base station) having means that monitors IP traffic that is transmitted and received by way of an Iu interface between a UE and a core network and determines whether to offload a packet session.

However, in the case of a configuration in which femto base stations are concentrated in an HeNB-GW, offloading from a femto base station is not necessarily required as in Non-Patent Document 1 or Patent Document 2 or 3. For example, it is possible for the HeNB-GW and not the femto base station to read the APN (Access Point Name) of a message that is transmitted to a UE from an MME in a core network or the APN of a message that is transmitted from a UE to the core network for establishing a PDN (Packet Data Network) connection and then offload traffic in accordance with the APN. This approach also enables a reduction of the load to the core network.

Still further, although there is concern in Non-Patent Document 1 (S2-096108) regarding the problem of security problems or the possibility of legal interception when implementing LIPA/SIPTO, these problems can be dealt with if the HeNB-GW is installed on the premises of a communication business. However, although the setting of ciphering in NAS signaling is currently open to selection in 3GPP, when ciphering is set, it is established that ciphering terminates at the MME. As a result, in LTE HeNB-GW, implementation of legal interception or offloading of traffic based on APN that is read from messages that are transmitted and received between an MME and UE is not recognized. For the same reason, an eNB that is a macro base station cannot offload traffic based on an APN.

In Patent Document 4, an IPsec (IP Security Protocol) tunnel is established based on IKEv2 (Internet Key Exchange version 2) between an AGW (Access Gateway: corresponding to an HeNB-GW) and a terminal (corresponding to a UE) to ensure security. Here, when security between a terminal and a base station is secured by another mechanism such as encryption of the radio link, problems arise such as an increase in the overhead for unnecessary IPsec tunnels, leading to pressure on the radio band or a decrease of processing capability of terminals. In Patent Document 4, a method is proposed in which, when security is ensured between a terminal and base station, an IPsec tunnel is provided only between the base station and an AGW, and an IPsec tunnel is not provided between the terminal and the base station. However, this method does not resolve the problems of the above-described (1) and (2).

As described hereinabove, even if femto based stations should come into wider use to cope with network traffic that will continue to increase, as long as an HeNB-GW is unable to set or cancel ciphering or integrity protection, the above-described problems will remain unsolved and concerns will remain regarding obstacles to the provision of service or to operating a communication business.

Similarly, there is concern for obstacles to the provision of services or operating a communication business even when a macro base station is unable to implement the setting or the cancelling of ciphering or integrity protection.

LITERATURE OF THE PRIOR ART

Patent Documents

Patent Document 1: Japanese Unexamined Patent Application Publication No. 2009-267706
Patent Document 2: Japanese Unexamined Patent Application Publication (Translation of PCT Application) No. 2009-504048
Patent Document 3: Japanese Unexamined Patent Application Publication No. 2009-253431
Patent Document 4: Japanese Unexamined Patent Application Publication No. 2009-094651

Non-Patent Documents

Non-Patent Document 1: 3GPP S2-096108

SUMMARY OF THE INVENTION

Problem to be Solved by the Invention

As described hereinabove, a problem exists in which HeNB-GW or macro base stations are unable to set or cancel ciphering or integrity protection in an LTE radio communication system.

It is therefore an object of the present invention to provide a gateway device, a base station, a mobile management server, and a communication method that are capable of solving the above-described problems.

Means for Solving the Problem

The gateway device of the present invention is a gateway device that connects a base station to a core network and that includes a communication unit that receives from a mobile management server in the core network a key that cancels ciphering that was set in an NAS message that was received from a terminal that is subordinate to the base station.

The base station of the present invention is a base station connected to a core network and includes:
a communication unit that receives from a mobile management server in the core network a key that cancels ciphering that was set in an NAS message that was received from a terminal that is subordinate to the base station.

The mobile management server of the present invention is a mobile management server that is provided in a core network and includes:
a communication unit that transmits, to a base station or a gateway device that connects the base station to the core network, a key that cancels ciphering that was set in an NAS message that the base station or the gateway device received from a terminal subordinate to the base station.

The first communication method of the present invention is a communication method realized by a gateway device that connects a base station to a core network and includes a step of:
receiving, from a mobile management server in the core network, a key that cancels ciphering that was set in an NAS message that was received from a terminal subordinate to the base station.

The second communication method of the present invention is a communication method realized by a base station that is connected to a core network and includes a step of:
receiving, from a mobile management server in the core network, a key that cancels ciphering that was set in an NAS message that was received from a terminal subordinate to the base station.

The third communication method of the present invention is a communication method realized by a mobile management server that is provided in a core network and includes a step of:
transmitting, to a base station or to a gateway device that connects the base station to the core network, a key that cancels ciphering that was set in an NAS message that the base station or the gateway device received from a terminal subordinate to the base station.

Effect of the Invention

According to the present invention, a key that cancels ciphering of an NAS message is transmitted to a gateway device or a base station from a mobile management server.

As a result, an effect is obtained in which the gateway device or base station is able to use the key that was received from the mobile management server to implement cancellation and setting of ciphering.

BRIEF DESCRIPTION OF THE DRAWINGS

FIG. 1 shows the configuration of the radio communication system of the first exemplary embodiment of the present invention.

FIG. 2 shows a conversion table that is saved in the memory unit of a HeNB-GW in the first exemplary embodiment of the present invention.

FIG. 5 shows the IE after conversion of TS33.401 that is proposed in the first exemplary embodiment of the present invention.

FIG. 6 shows the IE after conversion of TS36.413 that is proposed in the first exemplary embodiment of the present invention.

FIG. 7 shows the IE after conversion of TS36.413 that is proposed in the first exemplary embodiment of the present invention.

FIG. 8 shows the IE after conversion of TS36.413 that is proposed in the first exemplary embodiment of the present invention.

BEST MODE FOR CARRYING OUT THE INVENTION

Figure 3:
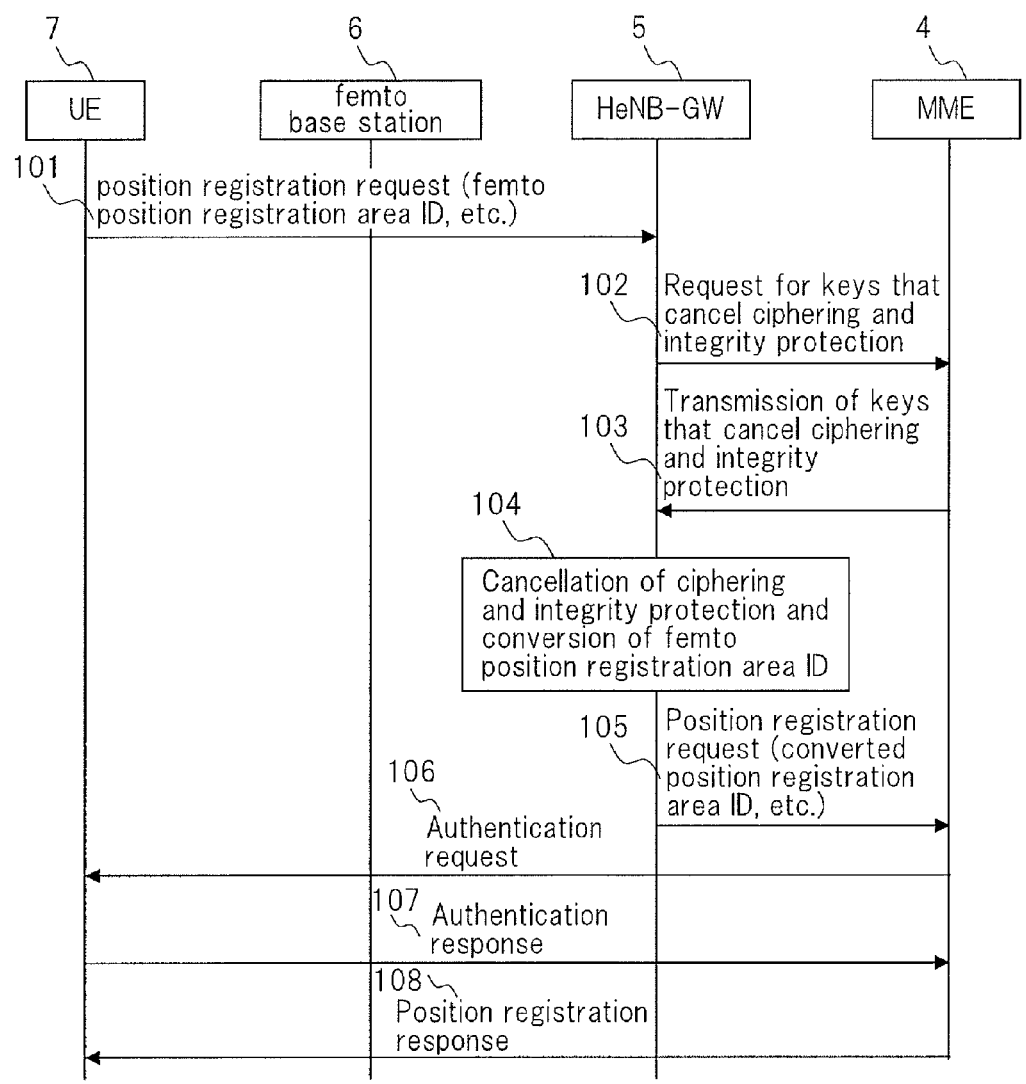
FIG. 3 is a sequence chart showing the operation of the radio communication system of the first exemplary embodiment of the present invention.

Modes for carrying out the present invention are next described with reference to the accompanying drawings.

(1) First Exemplary Embodiment (1-1) Configuration of the First Exemplary Embodiment FIG. 1 shows the schematic configuration of the radio communication system of the first exemplary embodiment of the present invention.

As shown in FIG. 1, the radio communication system of the present exemplary embodiment includes: PDN 1, P-GW (PDN Gateway) 2, S-GW (Serving Gateway) 3, MME 4, HeNB-GW 5, femto base station 6, and UE 7.

HeNB-GW 5 and femto base station 6 are provided in a radio access network (RAN).

P-GW 2, S-GW 3, and MME 4 are provided in the core network of a communication business, and PDN 1, which is, for example, the Internet or a business network, exists beyond this core network.

UE 7 transmits information (including messages and data) to MME 4 inside the core network by way of HeNB-GW 5 and femto base station 6 inside the radio access network.

HeNB-GW 5 includes communication unit 51 that transmits information to and receives information from the outside, processing unit 52 that processes information that is transmitted and received by communication unit 51, memory unit 53 that stores information that is processed by processing unit 52 and setting information that has been set in advance by the communication business, and control unit 54 that controls communication unit 51 and processing unit 52.

As an example, memory unit 53 stores, as setting information, conversion table 301 in which the femto position registration area ID of femto base station (first base station) 6 and the converted position registration area ID that is the macro position registration area ID of a macro base station (second base station) in the vicinity of this femto base station 6 have been placed in correspondence, as shown in FIG. 2.

MME 4 includes: communication unit 41 that transmits information to and receives information from the outside, processing unit 42 that processes information that is transmitted and received by communication unit 41, memory unit 43 that stores information that is processed by processing unit 42 and setting information that has been set in advance by the communication business, and control unit 44 that controls communication unit 41 and processing unit 42.

(1-2) Operation of the First Exemplary Embodiment

The gist of the operation of the radio communication system of the present exemplary embodiment is as described hereinbelow.

Upon entering the service area of femto base station 6, UE 7 receives the femto position registration area ID that is reported from femto base station 6 and transmits a position registration request that includes this femto position registration area ID toward MME 4 by way of the NAS.

Upon receiving the position registration request that was transmitted from UE 7 to MME 4, HeNB-GW 5 converts the femto position registration area ID that is contained in this position registration request to a converted position registration area ID based on conversion table 301 that is stored in memory unit 53 and transmits the converted position registration area ID to MME 4.

The above procedure is shown in FIG. 3.

As shown in FIG. 3, UE 7 that is subordinate to femto base station 6 first transmits a position registration request message (NAS message) that contains the femto position registration area ID that was received from femto base station 6 toward MME 4 by way of the NAS (Step 101).

In HeNB-GW 5, upon receiving a position registration request message that was transmitted from UE 7 and directed to MME 4, processing unit 52 judges whether the setting information "cancel ciphering and integrity protection" has been stored in memory unit 53. If this setting information has been stored, processing unit 52 generates a SECURITY INFO REQUEST message (S1AP (S1 Application Protocol) message) that requests the transmission of keys (ciphering key and integrity key) that cancel ciphering and integrity protection of the position registration request message, and communication unit 51 transmits this SECURITY INFO REQUEST message to MME 4 (Step 102).

In MME 4, upon receiving a SECURITY INFO REQUEST message from HeNB-GW 5, processing unit 42 generates a SECURITY INFO RESPONSE message (S1AP message) that includes keys (ciphering key and integrity key), and communication unit 41 returns this SECURITY INFO RESPONSE message to HeNB-GW 5 (Step 103).

In HeNB-GW 5, upon receiving the SECURITY INFO RESPONSE message from MME 4, processing unit 52 uses the keys that are contained in the SECURITY INFO RESPONSE message to cancel ciphering and integrity protection of the position registration request message and converts the femto position registration area ID that is contained in the position registration request message to a converted position registration area ID based on conversion table 301 that is stored in memory unit 53 (Step 104). Processing unit 52 next resets the ciphering and integrity protection in the position registration request message, and communication unit 51 transmits the position registration request message to MME 4 (Step 105).

MME 4 next transmits an authentication request message to UE 7 (Step 106). It is here assumed that an authentication process is normally implemented, and UE 7 returns an authentication response message to MME 4 (Step 107).

MME 4 subsequently transmits a position registration response message to UE 7 (Step 108), whereby the position registration process is completed.

Figure 4:
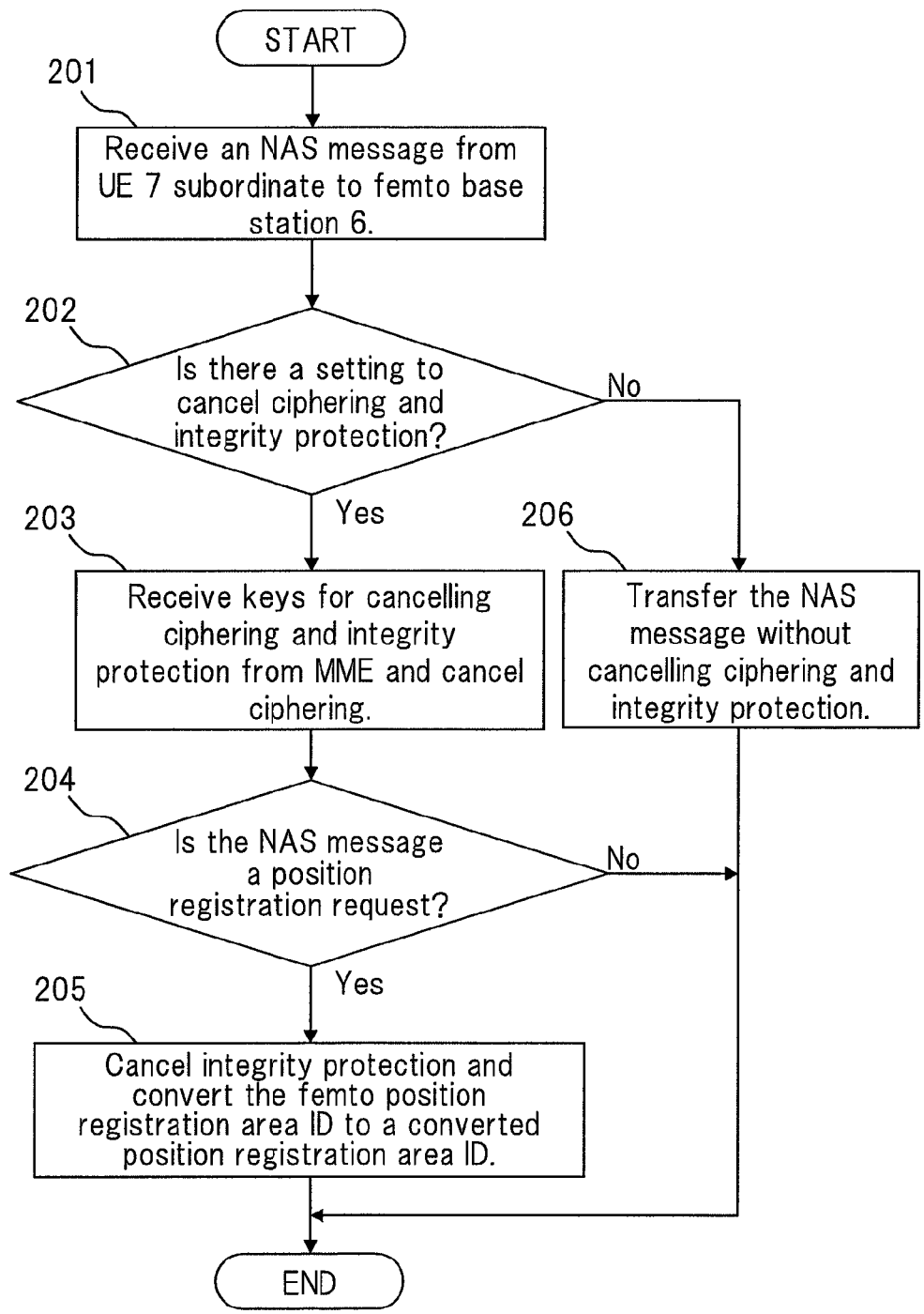
FIG. 4 is an algorithm that prescribes the operations of a HeNB-GW of the first exemplary embodiment of the present invention.

FIG. 4 shows an algorithm that prescribes the operations of HeNB-GW 5. This algorithm is stored as setting information in memory unit 53.

As shown in FIG. 4, upon receiving an NAS message from UE 7 that is subordinate to femto base station 6 (Step 201), processing unit 52 judges whether the setting information "cancel ciphering and integrity protection" is stored in memory unit 53 (Step 202).

If the setting information "cancel ciphering and integrity protection" is stored in Step 202 (YES in Step 202), processing unit 52 generates a SECURITY INFO REQUEST message requesting the transmission of a ciphering key and integrity key for cancelling ciphering and integrity protection of the NAS message, communication unit 51 transmits this SECURITY INFO REQUEST message to MME 4, and as a response to this message, receives a SECURITY INFO RESPONSE message from MME 4 that contains the ciphering key and integrity key. Processing unit 52 then uses the ciphering key that is contained in the SECURITY INFO RESPONSE message to cancel the ciphering of the NAS message (Step 203). As the process of cancelling ciphering, a process is here carried out in which the ciphering key is used to decode the NAS message.

Processing unit 52 next judges whether the NAS message received in Step 201 is a position registration request message (Step 204).

If the NAS message is a position registration request message in Step 204 (YES in Step 204), processing unit 52 first cancels integrity protection of the position registration request message. Here, as the process of cancelling integrity protection, a process is carried out of using the integrity key to verify the integrity of the position registration request message. Processing unit 52 next converts the femto position registration area ID that is contained in the position registration request message to the converted position registration area ID that was placed in correspondence with the femto position registration area ID in conversion table 301 that is stored in memory unit 53 (Step 205). Processing unit 52 next resets ciphering and integrity protection in the position registration request message. Here, as the process of resetting ciphering, processing unit 52 uses the ciphering key to carry out a process of ciphering the position registration request message. Further, as the process of resetting integrity protection, processing unit 52 uses the integrity key to carry out a process of calculating the authentication code of the position registration request message that follows conversion and adding the authentication code that was calculated to the position registration request message that follows conversion. Communication unit 51 then transmits the position registration request message to MME 4.

On the other hand, if the setting information "cancel ciphering and integrity protection" is not stored in Step 202 (NO in Step 202), processing unit 52 transfers the NAS message that was received in Step 201 from communication unit 51 to MME 4, as is, without cancelling ciphering and integrity protection (Step 206).

Alternatively, if the NAS message is not a position registration request message in Step 204 (NO in Step 204), processing unit 52 resets ciphering of the NAS message, and communication unit 51 transmits the NAS message to MME 4.

In order to implement the procedures shown in FIG. 3, the 3GPP recommendations must be modified. More specifically, the underlined portions of FIG. 5 must first be changed in TS33.401, and second, the underlined portions of FIG. 6 must be added to TS36.413.

In addition, although MME 4 transmits keys to HeNB-GW 5 by a SECURITY INFO RESPONSE message as a response to the reception of a SECURITY INFO REQUEST message from HeNB-GW 5 in the present exemplary embodiment, the present invention is not limited to this form. For example, the underlined portions of FIGS. 7 and 8 are added to TS36.413 and the setting information "transmit keys to HeNB-GW" are stored in memory unit 43 of MME 4. In this case, MME 4 spontaneously transmits keys by the UE CONTEXT MODIFICATION REQUEST message (S1AP message) shown in FIG. 7 or FIG. 8 whether or not a SECURITY INFO REQUEST message is received from HeNB-GW 5.

Although the intent of the alterations of FIG. 7 and FIG. 8 is the same, the expressions differ.

In addition, "Direction" in FIGS. 6-8 simply indicates the direction of transmission and does not indicate the termination node. For example, "MME→eNB" indicates applicability to transmission from MME 4 to HeNB-GW 5, and "eNB→MME" indicates applicability to transmission from HeNB-GW 5 to MME 4.

(1-3) Effects of the First Exemplary Embodiment

In the present exemplary embodiment, an MME transmits to an HeNB-GW keys that cancel ciphering and integrity protection of an NAS message either spontaneously or as a response to a transmission request from the HeNB-GW.

As a result, the HeNB-GW is able to use the keys that were received from the MME to carry out cancellation or setting of ciphering and integrity protection.

Accordingly, the method proposed in Patent Document 1 of converting the femto position registration area ID to a macro position registration area ID in the HeNB-GW can be realized in accordance with the 3GPP standard specifications.

Additional methods other than the method proposed in Patent Document 1 for reducing the frequency of position registration requests can be realized in accordance with the 3GPP standard specifications. As an example, there are methods such as the following method. Taking into consideration the geometric relation of femto base stations, the minimum necessary femto position registration area IDs are placed in correspondence with each individual base station. This correspondence table is then saved by the HeNB-GW, and for each position registration request, the femto position registration area ID of the femto base station that received the position registration request is converted based on the above-described correspondence table.

It is assumed that in Step 201 of FIG. 4 in the present exemplary embodiment, an NAS message is transmitted from a UE subordinate to a femto base station. However, this assumption does not require that certain limited UEs transmit NAS messages under the jurisdiction of certain limited femto base stations, and preconditions can be set independently for each UE or each femto base station. However, to identify the UE, an IMSI (International Mobile Subscriber Identifier) must be read from the NAS message.

The method proposed in the present exemplary embodiment can be applied to a radio communication system that includes UMTS (Universal Mobile Terrestrial Radio Access) femto base stations, a RANGW that concentrates femto base stations, and a service-providing server that is connected to the RANGW and that, instigated by the entry of a UE into the service area of a femto base station, offers services to the user from the service-providing server. In this case, an LTE HeNB-GW is able to offer similar services in conformity with 3GPP standard specifications.

In the present exemplary embodiment, when ciphering and integrity protection settings have been made between a UE and an MME, the alteration of existing recommendations has been proposed in order to enable cancellation of these settings. As the back ground that is the basis of these provisions of ciphering and integrity protection, one reason that can be considered is that, in view of network architecture, an NAS message is transmitted from a UE by way of an eNB (macro base station) and an MME, and the eNB, in contrast to an MME, is not installed in a secure environment such as the offices of a communication business. However, as long as the HeNB-GW is installed in the offices of a communication business, similar to an MME, the cancellation of ciphering and integrity protection in the HeNB-GW does not raise problems regarding security. As a result, the alteration of the 3GPP standard specifications that is proposed in the present exemplary embodiment brings about the effect of enabling a reduction of the number of position registration requests of an operator of a UE.

Still further, in the present exemplary embodiment, when an HeNB-GW cancels ciphering and integrity protection of an NAS message that is received from a UE, the HeNB-GW subsequently resets the ciphering and integrity protection, but the processing that follows cancellation of ciphering and integrity protection of an NAS message may be determined by the communication business. For example, when the ciphering and integrity protection of an NAS message have been cancelled, ciphering and integrity protection may not be reset between the HeNB-GW and the MME, or another security mechanism may be applied between the UE and the MME and ciphering and integrity protection are not reset.

In the present exemplary embodiment, an HeNB-GW is simultaneously received from an MME key for cancelling ciphering and integrity protection, but when settings have been applied to receive these keys separately, transmission requests for these keys can be carried out separately to the MME.

Figures 9, 10:
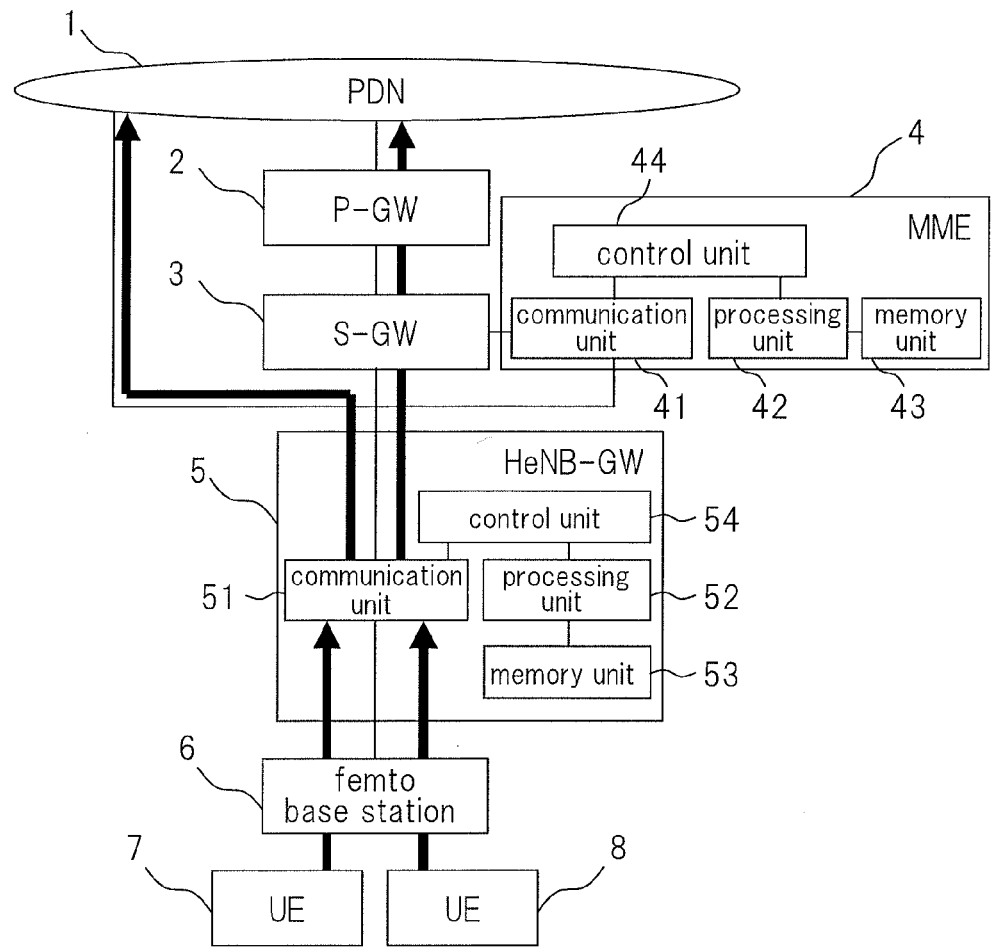
FIG. 9 shows the configuration of the radio communication system of the second exemplary embodiment of the present invention.
FIG. 10 shows the correspondence table that is saved in the memory unit of the HeNB-GW in the second exemplary embodiment of the present invention.

(2) Second Exemplary Embodiment (2-1) Configuration of the Second Exemplary Embodiment FIG. 9 shows the schematic configuration of the radio communication system of the second exemplary embodiment of the present invention.

As shown in FIG. 9, the radio communication system of the present exemplary embodiment has the same configuration as the radio communication system of the first exemplary embodiment shown in FIG. 1, with the exception of the points that UE 8 has been added and a route is directly connected from HeNB-GW 5 to PDN 1.

In the present exemplary embodiment, the transfer of information is carried out by way of a U-plane, and HeNB-GW 5 determines the route of a PDN connection according to the course that is set in advance by the communication business according to an APN that is contained in a PDN connection request (PDN CONNECTIVITY REQUEST) transmitted from UE 7 and 8.

In order to realize the above-described operations, memory unit 53 of HeNB-GW 5 stores, as setting information for each UE, correspondence table 302 that indicates the necessity or lack thereof of offloading according to an APN that is contained in a PDN connection request that is transmitted from that UE, as shown in FIG. 10.

(2-2) Operation of the Second Exemplary Embodiment

In brief, the radio communication system of the present exemplary embodiment operates as described hereinbelow.

UE 7 and 8, when setting an EPS (Evolved Packet System) bearer for setting an IP session referred to as a PDN connection with PDN 1 for communicating packets, transmit PDN connection requests that contain APN to MME 4.

Upon receiving the PDN connection requests that were transmitted to MME 4 from UE 7 and 8, HeNB-GW reads the APN that are contained in the PDN connection requests. HeNB-GW 5 then, based on correspondence table 302 that is stored in memory unit 53, determines whether to set a PDN connection from HeNB-GW 5 to PDN 1 by way of S-GW 3 and P-GW 2 or to set a PDN connection from HeNB-GW 5 directly to PDN 1 without being routed by way of S-GW 3 and P-GW 2.

Figure 11:
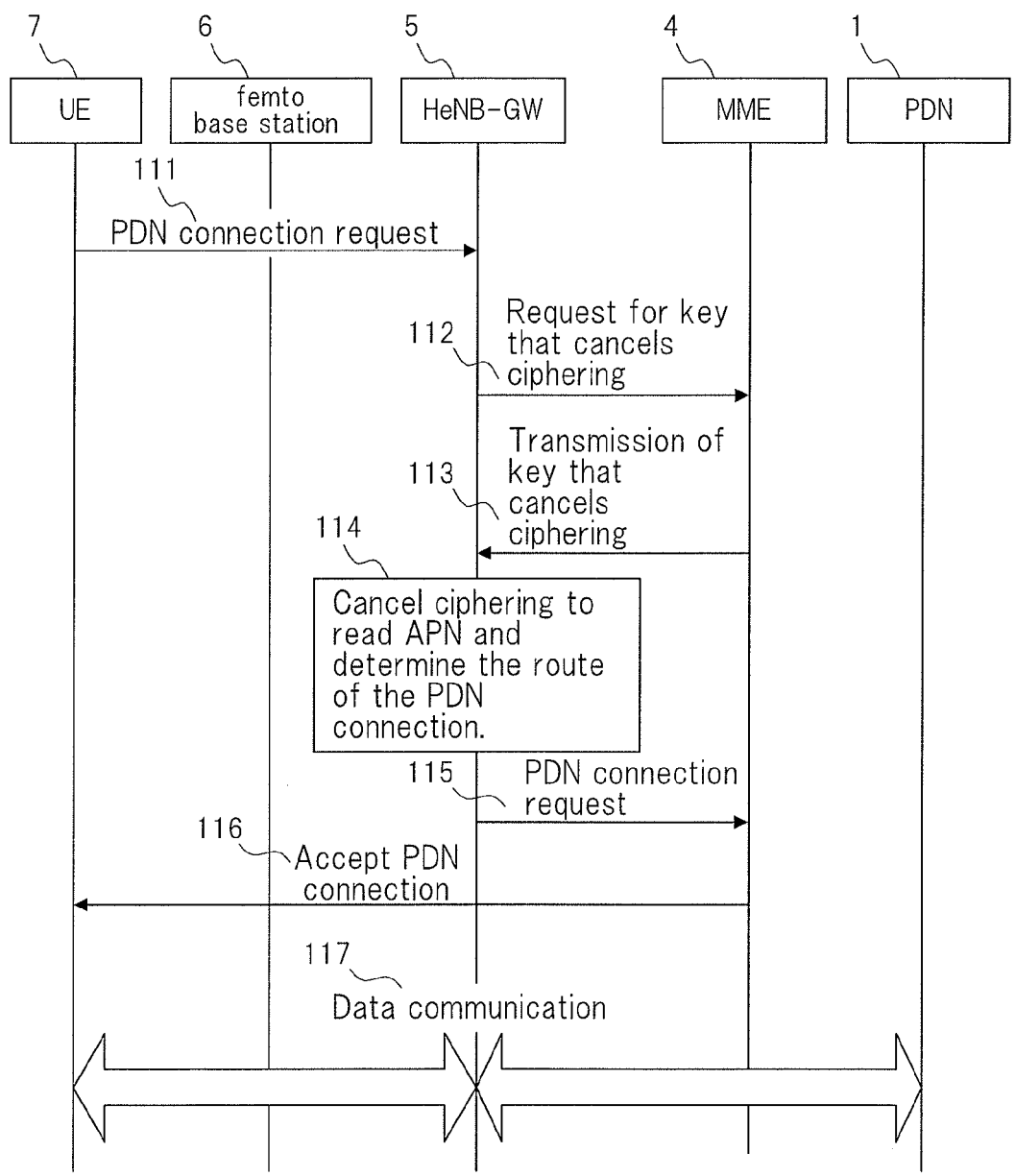
FIG. 11 is a sequence chart showing the operation of the radio communication system of the second exemplary embodiment of the present invention.

The above-described procedure is shown in FIG. 11.

As shown in FIG. 11, UE 7 that is subordinate to femto base station 6 transmits a PDN connection request message (NAS message) to MME 4 by way of NAS (Step 111).

In HeNB-GW 5, upon receiving the PDN connection request message that was transmitted to MME 4 from UE 7, processing unit 52 judges whether the setting information "cancel ciphering" is stored in memory unit 53. If this setting information is stored, processing unit 52 generates a SECURITY INFO REQUEST message requesting the transmission of a key (ciphering key) for cancelling ciphering of the PDN connection request message, and communication unit 51 transmits the SECURITY INFO REQUEST message to MME 4 (Step 112).

In MME 4, upon receiving the SECURITY INFO REQUEST message from HeNB-GW 5, processing unit 42 generates a SECURITY INFO RESPONSE message that contains a key (ciphering key), and communication unit 41 returns this SECURITY INFO RESPONSE message to HeNB-GW 5 (Step 113).

In HeNB-GW 5, upon receiving the SECURITY INFO RESPONSE message from MME 4, processing unit 52 uses the key that is contained in the SECURITY INFO RESPONSE message to cancel ciphering of the PDN connection request message, reads the APN that is contained in the PDN connection request message, and determines the route of the PDN connection based on correspondence table 301 that is stored in memory unit 53 (Step 114). Processing unit 52 then resets ciphering in the PDN connection request message, and communication unit 51 transmits the PDN connection request message to MME 4 (Step 115).

MME 4 subsequently transmits a PDN connection accepting message to UE 7 (Step 116), whereby data communication between UE 7 and PDN 1 becomes possible (Step 117).

Figure 12:
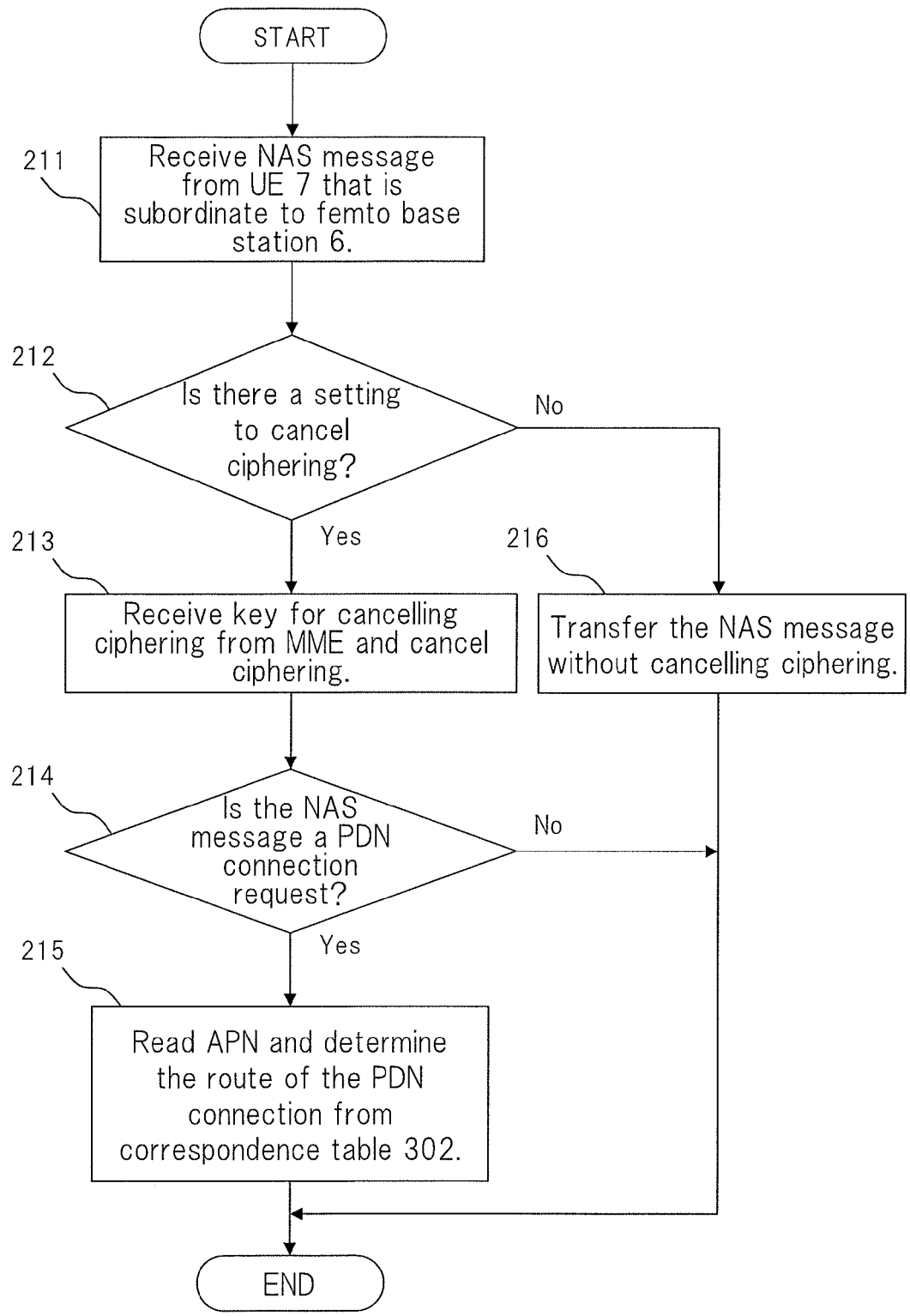
FIG. 12 is an algorithm that prescribes the operations of the HeNB-GW of the second exemplary embodiment of the present invention.

The algorithm that prescribes the above-described operations of HeNB-GW 5 is shown in FIG. 12. This algorithm is stored as setting information in memory unit 53.

As shown in FIG. 12, when an NAS message from UE 7 that is subordinate to femto base station 6 is received (Step 211), processing unit 52 judges whether the setting information "cancel ciphering" has been stored in memory unit 53 (Step 212).

If the setting information "cancel ciphering" is stored in Step 212 (YES in Step 212), processing unit 52 generates a SECURITY INFO REQUEST message requesting the transmission of a ciphering key to cancel ciphering of the NAS message, and communication unit 51 transmits the SECURITY INFO REQUEST message to MME 4 and receives the SECURITY INFO RESPONSE message that contains the ciphering key from MME 4 as a response. Processing unit 52 next uses the ciphering key that is contained in the SECURITY INFO RESPONSE message to cancel ciphering of the NAS message (Step 213). Here, as the process of cancelling ciphering, a process is carried out of using the ciphering key to decipher the NAS message.

Processing unit 52 next judges whether the NAS message received in Step 211 is a PDN connection request message (Step 214).

If the NAS message is a PDN connection request message in Step 214 (YES in Step 214), processing unit 52 first reads the APN that is contained in the PDN connection request message. Processing unit 52 next determines the route of the PDN connection based on the APN that was read and the necessity or lack thereof of offloading according to the APN that was read and that is indicated in correspondence table 302 that is stored in memory unit 53 (Step 215). For example, if the APN that was read is APN1, offloading is implemented and the route of the PDN connection is determined such that communication with PDN 1 is realized by way of APN1. Processing unit 52 next resets ciphering of the PDN connection request message. As the process of resetting ciphering, a process is here carried out of using the ciphering key to encode the PDN connection request message. Communication unit 51 then transmits the PDN connection request message to MME 4.

On the other hand, if the setting information "cancel ciphering" is not stored in Step 212 (NO in Step 212), processing unit 52 transfers the NAS message that was received in Step 211 from communication unit 51 to MME 4, as is, without cancelling ciphering (Step 216).

If the NAS message is not a PDN connection request message in Step 214 (NO in Step 214), processing unit 52 resets ciphering in the NAS message, and communication unit 51 transmits the NAS message to MME 4.

The 3GPP recommendations must be altered in order to implement the procedure shown in FIG. 11. More specifically, the underlined portions of FIG. 5 must first be altered for TS33.401, and second, the underlined portions of FIG. 6 must be added to TS36.413.

In the present exemplary embodiment, upon receiving a SECURITY INFO REQUEST message from HeNB-GW 5, MME 4 transmits a key to HeNB-GW 5 by a SECURITY INFO RESPONSE message as a response, but the present invention is not limited to this form. For example, the underlined portions of FIGS. 7 and 8 are added to TS36.413, and the setting information "Transmit keys to HeNB-GW" is stored in memory unit 43 of MME 4. In this case, MME 4 spontaneously transmits keys by the UE CONTEXT MODIFICATION REQUEST message shown in FIG. 7 or FIG. 8 regardless of the reception or non-reception of a SECURITY INFO REQUEST message from HeNB-GW 5.

Although the intent of the alterations of FIG. 7 and FIG. 8 is the same, the expressions differ.

(2-3) Effects of the Second Exemplary Embodiment

In the present exemplary embodiment, an MME transmits to an HeNB-GW a key for cancelling ciphering of an NAS message either spontaneously or in response to a transmission request from the HeNB-GW.

As a result, an HeNB-GW is able to use the key that was received from an MME to carry out cancellation or setting of ciphering.

Accordingly, a method in which an HeNB-GW offloads traffic in accordance with the APN of the application that is used for each user in a secure environment such as the offices of a communication business can be realized in conformity with 3GPP standard specifications.

As a result, simultaneous improvements in legal interception, security risk reduction, mitigation of load upon equipment, and user experience can be achieved in HeNB-GW.

In addition, although a procedure was shown in the present exemplary embodiment in which an HeNB-GW reads the APN contained in a PDN connection request message, the APN that is contained in another NAS message that is transmitted to a core network from a UE may be read and the route of a PDN connection may be established such that the above-described effects are obtained. Examples of other NAS messages that can be offered include an ACTIVATE DEFAULT EPS BEARER CONTEXT REQUEST message or an ESM INFORMATION REQUEST message described in TS24.301 v9.1.0.

In addition, when an HeNB-GW cancels ciphering of an NAS message that is received from a UE, the HeNB-GW subsequently resets ciphering, but processing that follows cancellation of ciphering of the NAS message may be determined by the communication business. For example, when ciphering of an NAS message is cancelled, it is also possible to not reset ciphering between the HeNB-GW and the MME or to apply another security mechanism between the UE and the MME and to not reset ciphering.

(3) Other Exemplary Embodiments

Although the first exemplary embodiment and second exemplary embodiment have been shown independently, the procedures of the first exemplary embodiment and second exemplary embodiment may, if possible, be simultaneously implemented.

Further, although it is assumed in both the first exemplary embodiment and second exemplary embodiment that the HeNB-GW is installed in the offices of a communication business, a configuration in which a portion of the HeNB-GW is installed on the premises of another corporation and this portion then connected to other HeNB-GW installed in the offices of a communication business, or a configuration in which this portion of the HeNB-GW is connected directly to the MME, may be used. Alternatively, when an HeNB-GW is installed within the premises of a corporation, the data offload destination shown in the second exemplary embodiment may be equipment within the premises of that corporation rather than a PDN.

In addition, although an example was shown in FIGS. 6-8 in the first exemplary embodiment and second exemplary embodiment in which an IE (Information Element) of an S1AP message was altered or added, the first exemplary embodiment and second exemplary embodiment may be implemented by the alteration or addition of an IE of another S1AP message. An example of another S1AP message that can be offered is an Uplink NAS Transport message.

In the first exemplary embodiment and second exemplary embodiment, femto base stations are concentrated in an HeNB-GW, but when femto base stations are directly connected to an MME, the cancellation of ciphering and integrity protection can be implemented in the femto base stations. In this case, the configuration of the femto base station may be a configuration similar to that of the HeNB-GW of the first exemplary embodiment and the second exemplary embodiment. It is further assumed that the cancellation of ciphering and integrity protection can also be implemented in a macro base station (eNB) that is directly connected to an MME. In this case, the configuration of the macro base station should be a configuration similar to the HeNB-GW of the first exemplary embodiment and second exemplary embodiment.

The modes proposed in the first exemplary embodiment and second exemplary embodiment presuppose the alteration of the 3GPP standard specifications shown in FIGS. 5-8, but these modifications also enable data offloading from a macro base station, and data offloading from a macro base station may therefore also be implemented. In this case, the configuration of the macro base station should be a configuration similar to the HeNB-GW of the first exemplary embodiment and second exemplary embodiment.

When information that is present in a secure environment such as the offices of a communication business is communicated from another network node or an O&M (Operations and Maintenance) device to an HeNB-GW, this communication may be reported to an MME by, for example, an S1 SETUP REQUEST message (S1AP message) and ciphering and integrity protection may not be set in NAS messages between the MME and UE. In this case, IPsec or SSL (Secure Sockets Layer)/TSL (Transport Layer Security) may be applied such that protocol is terminated at UE and HeNB-GW for controlling information at the HeNB-GW.

The methods that are carried out at the HeNB-GW, macro base station, and MME of the present invention may be applied to a program for causing execution by a computer. This program can be stored in a recording medium and can be provided to the outside by way of a network.

All or a portion of the above-described exemplary embodiments can also be described as in the following supplementary notes but are not limited to the following description.

(Supplementary Note 1)

A gateway device that connects a base station and a core network includes a communication unit that receives, from a mobile management server in the core network, a key that cancels ciphering that is set in an NAS message that was received from a terminal that is subordinate to the base station.

(Supplementary Note 2)

In the gateway device described in Supplementary Note 1, the communication unit receives, from the mobile management server, a key that cancels integrity protection that was set in an NAS message that was received from the terminal.

(Supplementary Note 3)

The gateway device described in Supplementary Note 1 further includes a processing unit that, when an NAS message is received from the terminal, generates an S1AP message that requests transmission of a key that cancels the ciphering;

wherein the communication unit, upon receiving an NAS message from the terminal, transmits an S1AP message that requests transmission of a key that cancels the ciphering to the mobile management server and receives as a response from the mobile management server an S1AP message that contains a key that cancels the ciphering.

(Supplementary Note 4)

The gateway device described in Supplementary Note 1 or Supplementary Note 3 in which a PDN is connected to the core network further includes a memory unit that stores a correspondence table that indicates, for each of the terminals, the necessity or lack thereof of offloading to the PDN that accords with an APN that is contained in a PDN connection request message that was transmitted as an NAS message from that terminal;

wherein the processing unit:

at the time of receiving an NAS message from the terminal, uses a key that cancels the ciphering to cancel ciphering that was set in the NAS message that was received from the terminal, and when the NAS message that was received from the terminal is a PDN connection request message, determines the route of the PDN connection based on the APN that is contained in that PDN connection request message and the necessity of offloading or lack thereof according to the APN that is indicated in the correspondence table.

(Supplementary Note 5)

The gateway device described in Supplementary Note 2 further includes a processing unit that, upon receiving an NAS message from the terminal, generates an S1AP message requesting the transmission of keys for cancelling the ciphering and the integrity protection;

wherein the communication unit, at the time of receiving the NAS message from the terminal, transmits to the mobile management server an S1AP message that requests the transmission of keys for cancelling the ciphering and the integrity protection, and receives as a response from the mobile management server an S1AP message that contains keys that cancel the ciphering and the integrity protection.

(Supplementary Note 6)

The gateway device described in Supplementary Note 2 or Supplementary Note 5, in which the base station is a first base station, further includes a memory unit that stores a conversion table in which the identifier of the position registration area of the first base station is placed in correspondence with the identifier of the position registration area of a second base station in the vicinity of the first base station;

wherein the processing unit, upon receiving an NAS message from the terminal, uses the key that cancels the ciphering to cancel ciphering that was set in the NAS message that was received from the terminal, and when the NAS message that was received from the terminal is a position registration request message, the processing unit uses the key that cancels the integrity protection to cancel the integrity protection that was set in the position registration request message and converts the identifier of the position registration area of the first base station that is contained in the position registration request message to the identifier of the position registration area of the second base station that was placed in correspondence in the conversion table.

(Supplementary Note 7)

A base station that is connected to a core network includes a communication unit that receives from a mobile management server in the core network a key that cancels ciphering that was set in NAS message that was received from terminal subordinate to the base station.

(Supplementary Note 8)

In the base station described in Supplementary Note 7, the communication unit receives from the mobile management server a key that cancels integrity protection that was set in NAS message that was received from the terminal.

(Supplementary Note 9)

The base station described in Supplementary Note 7 further includes a processing unit that, upon receiving an NAS message from the terminal, generates an S1AP message that requests the transmission of a key that cancels the ciphering;

wherein the communication unit, at the time of reception of an NAS message from the terminal, transmits to the mobile management server an S1AP message that requests the transmission of a key that cancels the ciphering and receives as a response from the mobile management server an S1AP message that contains a key that cancels the ciphering.

(Supplementary Note 10)

The base station described in Supplementary Note 7 or Supplementary Note 9, in which a PDN is connected to the core network, further includes a memory unit that stores a correspondence table that indicates, for each of said terminal, the necessity or lack thereof of offloading to the PDN according to an APN that is contained in a PDN connection request message that is transmitted as an NAS message from the terminal;

wherein the processing unit, upon receiving an NAS message from the terminal, uses the key that cancels the ciphering to cancel ciphering that was set in the NAS message that was received from the terminal; and when the NAS message that was received from the terminal is a PDN connection request message, determines the route of a PDN connection based on the APN that is contained in the PDN connection request message and the necessity or lack thereof of offloading according to the APN that is indicated in the correspondence table.

(Supplementary Note 11)

The base station described in Supplementary Note 8 further includes a processing unit that, upon reception of an NAS message from the terminal, generates an S1AP message that requests transmission of keys that cancel the ciphering and the integrity protection;

wherein the communication unit, upon reception of an NAS message from the terminal, transmits to the mobile management server an S1AP message that requests transmission of keys that cancel the ciphering and the integrity protection and receives as a response from the mobile management server an S1AP message that contains keys that cancel the ciphering and the integrity protection.

(Supplementary Note 12)

The base station described in Supplementary Note 8 or Supplementary Note 11, in which the base station which is the first base station, further includes a memory unit that stores a conversion table that places in correspondence the identifier of the position registration area of the first base station and the identifier of the position registration area of a second base station in the vicinity of the first base station;

wherein the processing unit, at the time of reception of an NAS message from the terminal, uses the key that cancels the ciphering to cancel ciphering that was set in the NAS message that was received from the terminal, and when the NAS message that was received from the terminal is a position registration request message, uses the key that cancels the integrity protection to cancel the integrity protection that was set in the position registration request message and converts the identifier of the position registration area of the first base station that is contained in the position registration request message to the identifier of the position registration area of the second base station that was placed in correspondence in the conversion table.

(Supplementary Note 13)

A mobile management server that is provided in a core network includes a communication unit that transmits, to a base station or to a gateway device that connects the base station to the core network, a key that cancels ciphering that was set in an NAS message that the base station or the gateway device received from a terminal that is subordinate to the base station.

(Supplementary Note 14)

In the mobile management server described in Supplementary Note 13, the communication unit transmits to the base station or to the gateway device a key that cancels integrity protection that was set in an NAS message that was received from the terminal in the base station or the gateway device.

(Supplementary Note 15)

The mobile management server described in Supplementary Note 13 further includes a processing unit that, upon reception of an S1AP message that requests the transmission of a key that cancels the ciphering from the base station or the gateway device, generates an SLAP message that contains a key that cancels the ciphering;

wherein the communication unit, upon reception of an S1AP message that requests transmission of a key that cancels the ciphering from the base station or the gateway device, transmits an SLAP message that contains a key that cancels the ciphering as a response.

(Supplementary Note 16)

The mobile management server described in Supplementary Note 14 further includes a processing unit that, upon reception of an S1AP message that requests transmission of keys that cancel the ciphering and the integrity protection from the base station or the gateway device, generates an SLAP message that contains keys that cancel the ciphering and the integrity protection;

wherein the communication unit, upon reception of an S1AP message that requests transmission of keys that cancel the ciphering and the integrity protection from the base station or the gateway device, transmits an SLAP message that contains keys that cancel the ciphering and the integrity protection as a response.

(Supplementary Note 17)

A communication method realized by a gateway device that connects a base station to a core network includes a step of receiving from a mobile management server in the core network a key that cancels ciphering that was set in an NAS message that was received from a terminal that is subordinate to the base station.

(Supplementary Note 18)

A communication method realized by a base station that is connected to a core network includes a step of receiving from a mobile management server in the core network a key that cancels ciphering that was set in an NAS message that was received from a terminal that is subordinate to the base station.

(Supplementary Note 19)

A communication method that is realized by a mobile management server that is provided in a core network includes a step of transmitting, to a base station or to a gateway device that connects the base station to the core network, a key that cancels ciphering that was set in NAS message that the base station or the gateway device received from terminal subordinate to the base station.

What is claimed is:

1. A gateway device that connects a base station to a core network, comprising:
    a communication unit that receives from a mobile management server in said core network a key that cancels ciphering that was set in a Non Access Stratum message that was received from a terminal that is subordinate to said base station;
    a processing unit; and
    a memory unit that stores a correspondence table that indicates, for each said terminal, the necessity or lack thereof of offloading to a Packet Data Network according to a Access Point Name that is contained in a Packet Data Network connection request message transmitted as a Non Access Stratum message from that terminal;
    wherein:
    the Packet Data Network is connected to said core network; and
    said processing unit:
        upon reception of a Non Access Stratum message from said terminal, uses the key to cancel ciphering that was set in the Non Access Stratum message that was received from said terminal; and
        when a Non Access Stratum message that was received from said terminal is a Packet Data Network connection request message, determines the route of a Packet Data Network connection based on the Access Point Name contained in the Packet Data Network connection request message and the necessity or lack thereof of offloading according to the Access Point Name that is indicated in said correspondence table.

2. A gateway device that connects a base station to a core network, comprising:
    a communication unit that receives from a mobile management server in said core network a key that cancels ciphering that was set in a Non Access Stratum message that was received from a terminal that is subordinate to said base station; and
    a processing unit;
    wherein:
    said communication unit receives from said mobile management server a key that cancels integrity protection that was set in a Non Access Stratum message that was received from said terminal;
    said base station is a first base station comprising a memory unit that stores a conversion table that places in correspondence the identifier of a position registration area of the first base station and the identifier of a position registration area of a second base station that is in the vicinity of the first base station; and
    said processing unit:
        upon reception of the Non Access Stratum message from said terminal uses the key that cancels said ciphering to cancel ciphering that was set in the Non Access Stratum message that was received from said terminal; and
        when the Non Access Stratum message that was received from said terminal is a position registration request message, uses the key that cancels said integrity protection to cancel integrity protection that was set in the position registration request message and converts the identifier of the position registration area of the first base station contained in the position registration request message to the identifier of the position registration area of the second base station that was placed in correspondence in said conversion table.

3. A base station that is connected to a core network, comprising:
    a communication unit that receives, from a mobile management server in said core network, a key that cancels ciphering that was set in a Non Access Stratum message that was received from a terminal subordinate to said base station;
    a processing unit; and
    a memory unit that stores a correspondence table that indicates, for each said terminal, the necessity or lack thereof of offloading to a Packet Data Network according to a Access Point Name that is contained in a Packet Data Network connection request message transmitted as the Non Access Stratum message from that terminal;
    wherein:
    a Packet Data Network is connected to said core network; and
    said processing unit:
        upon reception of the Non Access Stratum message from said terminal, uses the key to cancel ciphering that was set in the Non Access Stratum message that was received from said terminal; and
        when the Non Access Stratum message that was received from said terminal is a Packet Data Network connection request message, determines the route of a Packet Data Network connection based on the Access Point Name contained in the Packet Data Network connection request message and the necessity or lack thereof of offloading according to the Access Point Name that is indicated in said correspondence table.

4. A communication method realized by a gateway device that connects a base station to a core network, comprising:
    receiving, from a mobile management server in said core network, a key that cancels ciphering that was set in a Non Access Stratum message that was received from a terminal subordinate to said base station;
    upon reception of a Non Access Stratum message from said terminal, using the key to cancel ciphering that was set in the Non Access Stratum message that was received from said terminal; and
    when the Non Access Stratum message that was received from said terminal is a Packet Data Network connection request message, determining the route of a Packet Data Network connection based on an Access Point Name contained in a Packet Data Network connection request message and the necessity or lack thereof of offloading according to the Access Point Name that is indicated in a correspondence table;
    wherein:
    a Packet Data Network is connected to said core network; and
    said gateway device comprises a memory unit that stores the correspondence table that indicates, for each said terminal, the necessity or lack thereof of offloading to the Packet Data Network according to the Access Point Name that is contained in the Packet Data Network connection request message transmitted as the Non Access Stratum message from that terminal.

5. A communication method realized by a base station that is connected to a core network, comprising:
receiving, from a mobile management server in said core network, a key that cancels ciphering that was set in a Non Access Stratum message that was received from a terminal subordinate to said base station;
upon reception of the Non Access Stratum message from said terminal, using the key to cancel ciphering that was set in the Non Access Stratum message that was received from said terminal; and
when the Non Access Stratum message that was received from said terminal is a Packet Data Network connection request message, determining the route of a Packet Data Network connection based on an Access Point Name contained in a Packet Data Network connection request message and the necessity or lack thereof of offloading according to the Access Point Name that is indicated in a correspondence table;
wherein:
a Packet Data Network is connected to said core network; and
said base station comprises a memory unit that stores the correspondence table that indicates, for each said terminal, the necessity or lack thereof of offloading to the Packet Data Network according to the Access Point Name that is contained in the Packet Data Network connection request message transmitted as the Non Access Stratum message from that terminal.

6. A base station that is connected to a core network, comprising:
a communication unit configured to receive, from a mobile management server in said core network, a key that cancels ciphering that was set in a Non Access Stratum message that was received from terminal subordinate to said base station; and
a processing unit;
wherein:
said communication unit is configured to receive from said mobile management server a key that cancels integrity protection that was set in the Non Access Stratum message that was received from said terminal;
said base station is a first base station comprising a memory unit that is configured to store a conversion table that places in correspondence the identifier of a position registration area of the first base station and the identifier of a position registration area of a second base station that is in the vicinity of the first base station; and
said processing unit:
upon reception of the Non Access Stratum message from said terminal, is configured to use the key that cancels said ciphering to cancel ciphering that was set in the Non Access Stratum message that was received from said terminal; and
when the Non Access Stratum message that was received from said terminal is a position registration request message, is configured to use the key that cancels said integrity protection to cancel integrity protection that was set in the position registration request message and to convert the identifier of the position registration area of the first base station contained in the position registration request message to the identifier of the position registration area of the second base station that was placed in correspondence in said conversion table.

7. A communication method realized by a gateway device that connects a base station to a core network, comprising:
receiving, from a mobile management server in said core network, a key that cancels ciphering that was set in a Non Access Stratum message that was received from a terminal subordinate to said base station;
receiving, from said mobile management server, a key that cancels integrity protection that was set in the Non Access Stratum message that was received from said terminal;
upon reception of the Non Access Stratum message from said terminal, using the key that cancels said ciphering to cancel ciphering that was set in the Non Access Stratum message that was received from said terminal; and
when the Non Access Stratum message that was received from said terminal is a position registration request message, using the key that cancels said integrity protection to cancel integrity protection that was set in the position registration request message and converting an identifier of a position registration area of a first base station contained in the position registration request message to an identifier of a position registration area of a second base station that is placed in correspondence in a conversion table;
wherein said base station is the first base station, the first base station comprises a memory unit that stores the conversion table that places in correspondence the identifier of the position registration area of the first base station and the identifier of the position registration area of the second base station that is in the vicinity of the first base station.

8. A communication method realized by a base station that is connected to a core network, comprising the steps of:
receiving, from a mobile management server in said core network, a key that cancels ciphering that was set in a Non Access Stratum message that was received from a terminal subordinate to said base station;
receiving, from said mobile management server, a key that cancels integrity protection that was set in the Non Access Stratum message that was received from said terminal;
upon reception of the Non Access Stratum message from said terminal, using the key that cancels said ciphering to cancel ciphering that was set in the Non Access Stratum message that was received from said terminal; and
when the Non Access Stratum message that was received from said terminal is a position registration request message, using the key that cancels said integrity protection to cancel integrity protection that was set in the position registration request message and converting an identifier of a position registration area of a first base station contained in the position registration request message to an identifier of a position registration area of a second base station that is placed in correspondence in a conversion table,
wherein said base station is the first base station, the first base station comprises a memory unit that stores the conversion table that places in correspondence the identifier of the position registration area of the first base station and the identifier of the position registration area of the second base station that is in the vicinity of the first base station.

* * * * *

UNITED STATES PATENT AND TRADEMARK OFFICE
CERTIFICATE OF CORRECTION

PATENT NO.        : 9,049,684 B2
APPLICATION NO.   : 13/637931
DATED             : June 2, 2015
INVENTOR(S)       : Tomu Tamura and Yoshio Ueda It is certified that error appears in the above-identified patent and that said Letters Patent is hereby corrected as shown below:

In the specification

Column 15, Line 19: Delete "SLAP" and insert -- S1AP --

Column 15, Line 25: Delete "SLAP" and insert -- S1AP --

Column 15, Line 58: Delete "SLAP" and insert -- S1AP --

Column 16, Line 36: Delete "SLAP" and insert -- S1AP --

Column 16, Line 41: Delete "SLAP" and insert -- S1AP --

Column 16, Line 49: Delete "SLAP" and insert -- S1AP --

Column 16, Line 54: Delete "SLAP" and insert -- S1AP --

Signed and Sealed this
Eighth Day of December, 2015

Michelle K. Lee
*Director of the United States Patent and Trademark Office*